United States Patent
Kolesnikov et al.

(10) Patent No.: US 9,690,568 B2
(45) Date of Patent: *Jun. 27, 2017

(54) CLIENT-SIDE SCRIPT BUNDLE MANAGEMENT SYSTEM

(71) Applicant: Facebook, Inc., Menlo Park, CA (US)

(72) Inventors: Vladimir Kolesnikov, Redwood City, CA (US); Andrey Sukhachev, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 247 days.

This patent is subject to a terminal disclaimer.

(21) Appl. No.: 14/495,782

(22) Filed: Sep. 24, 2014

(65) Prior Publication Data

US 2015/0012915 A1 Jan. 8, 2015

Related U.S. Application Data

(63) Continuation of application No. 13/549,363, filed on Jul. 13, 2012, now Pat. No. 8,910,132.

(51) Int. Cl.
*G06F 9/445* (2006.01)
*G06F 9/44* (2006.01)
*H04L 29/08* (2006.01)

(52) U.S. Cl.
CPC ........... *G06F 8/65* (2013.01); *G06F 8/61* (2013.01); *G06F 8/71* (2013.01); *H04L 67/10* (2013.01); *G06F 8/64* (2013.01)

(58) Field of Classification Search
CPC ..... G06F 8/61; G06F 8/64; G06F 8/65; G06F 8/71; H04L 67/10

USPC ........................................................ 717/170
See application file for complete search history.

(56) References Cited

U.S. PATENT DOCUMENTS

| | | |
|---|---|---|
| 6,167,567 A | 12/2000 | Chiles et al. |
| 6,920,630 B2 | 7/2005 | Jackson |
| 6,944,828 B2 | 9/2005 | Gao et al. |
| 7,000,185 B1 | 2/2006 | Murren et al. |
| 7,404,177 B1 | 7/2008 | Greenfield et al. |
| 7,814,404 B2 | 10/2010 | Shenfield |
| 8,006,224 B2 | 8/2011 | Bateman et al. |
| 8,132,149 B2 | 3/2012 | Shenfield et al. |
| 8,412,802 B2 | 4/2013 | Greiner et al. |
| 8,448,163 B2 | 5/2013 | Backhouse |
| 8,645,944 B2 | 2/2014 | Mechelke et al. |

(Continued)

OTHER PUBLICATIONS

Non-Final Office Action Mailed Dec. 16, 2013 in Co-Pending U.S. Appl. No. 13/549,363 of Kolesnikov, K., et al., filed Jul. 13, 2012.

(Continued)

*Primary Examiner* — John Chavis
(74) *Attorney, Agent, or Firm* — Perkins Coie LLP (57) ABSTRACT

A method of operation of a bundle management system includes: generating a resource bundle with client-based script code based on a client device condition of a potential client device; generating a condition map correlating the client device condition to the resource bundle; generating a bundle set including the resource bundle based on a developer version of the client-based script code; uploading the condition map to a web service system; and configuring the web service system to operate a web service corresponding to the developer version of the bundle set.

20 Claims, 6 Drawing Sheets

(56) References Cited

U.S. PATENT DOCUMENTS

| | | |
|---|---|---|
| 8,769,493 B2 | 7/2014 | Arnold et al. |
| 8,910,132 B2 * | 12/2014 | Kolesnikov .............. G06F 8/61 717/140 |
| 2002/0162093 A1 | 10/2002 | Zhou et al. |
| 2003/0110469 A1 | 6/2003 | Jackson |
| 2003/0112274 A1 | 6/2003 | Gao et al. |
| 2003/0204602 A1 * | 10/2003 | Hudson ................. D01D 5/423 709/228 |
| 2004/0128614 A1 | 7/2004 | Andrews et al. |
| 2006/0200748 A1 | 9/2006 | Shenfield |
| 2006/0235970 A1 | 10/2006 | Bateman et al. |
| 2008/0046882 A1 | 2/2008 | Blackhouse |
| 2009/0019313 A1 | 1/2009 | Pokala et al. |
| 2010/0042604 A1 | 2/2010 | Mechelke et al. |
| 2010/0131922 A1 | 5/2010 | Shenfield et al. |
| 2010/0205239 A1 | 8/2010 | Greiner et al. |
| 2010/0293461 A1 | 11/2010 | Boezeman et al. |
| 2010/0299364 A1 | 11/2010 | Baldwin et al. |
| 2012/0084752 A1 | 4/2012 | Arnold et al. |
| 2012/0084769 A1 | 4/2012 | Adi et al. |
| 2013/0046873 A1 | 2/2013 | O et al. |
| 2013/0138767 A1 | 5/2013 | Vecera et al. |
| 2013/0173684 A1 | 7/2013 | Kuchhal |
| 2013/0227056 A1 | 8/2013 | Vecera et al. |
| 2014/0019953 A1 | 1/2014 | Kolesnikov et al. |
| 2015/0248287 A1 * | 9/2015 | Kotani ..................... G06F 8/65 717/172 |

OTHER PUBLICATIONS

Final Office Action Mailed May 8, 2014 in Co-Pending U.S. Appl. No. 13/549,363 of Kolesnikov, K., et al., filed Jul. 13, 2012.

Co-Pending U.S. Appl. No. 13/549,363 of Kolesnikov, K., et al., filed Jul. 13, 2012.

Margaret Rouse, "Content Delivery Network (CDN)", Mar. 2011, Whatis.com, (Whole Document).

Notice of Allowance Mailed Aug. 8, 2014 in Co-Pending U.S. Appl. No. 13/549,363 of Kolesnikov, K., et al., filed Jul. 13, 2012.

* cited by examiner

CLIENT-SIDE SCRIPT BUNDLE MANAGEMENT SYSTEM

CROSS-REFERENCE

This application is a continuation of U.S. patent application Ser. No. 13/549,363, entitled "CLIENT-SIDE SCRIPT BUNDLE MANAGEMENT SYSTEM," filed on Jul. 13, 2012, which is incorporated herein by reference in its entirety.

FIELD OF INVENTION

This invention relates generally to a web service update system, and in particular to updating a web application with updates to client-side script code.

BACKGROUND

In the recent years web applications have become an important aspect of the user experience when surfing the World Wide Web. Now applications are capable of processing large amounts of data and media content to provide information for the users in different ways. The popularity of the web applications often has a downside. A significant number of web servers are necessary to serve webpages for large number of users accessing these web services and/or web applications. Typically, when updating the web service applications, the new versions of the applications are delivered to every single one of the web service servers.

Compiled web applications often require significant amount of memory space. To provide a consistent experience to the users, the compiled web applications and updates to the compiled web applications are updated in timed phases to all the web service systems. As a result, testing and updating web applications for traditional systems require a long delay of time.

Thus, a need remains for an effective methodology to update web application intelligence.

SUMMARY

Embodiments of the invention provide a method of operation of a bundle management system comprising: generating a resource bundle with client-based script code based on a client device condition of a potential client device; generating a condition map correlating the client device condition to the resource bundle; generating a bundle set including the resource bundle based on a developer version of the client-based script code; uploading the condition map to a web service system; and configuring the web service system to operate a web service corresponding to the developer version of the bundle set A method of operating a bundle management system is also disclosed comprising: generating a resource bundle with client-based script code based on a client device condition of a potential client device; generating a condition map correlating the client device condition to the resource bundle; generating a bundle set including the resource bundle based on a developer version of the client-based script code; pushing the bundle set onto an origination database for propagating the bundle set to a content delivery network for caching; uploading the condition map to a web service system; and configuring the web service system to operate a web service corresponding to the developer version of the bundle set.

Embodiments further include a method of operating a bundle management system via a web service system comprising: storing a condition map in a map store, the condition map correlating a potential client device condition to a resource bundle; receiving a Uniformed Resource Locator (URL) request; receiving a client device condition; locating the resource bundle from the condition map by comparing the client device condition with the potential client device condition in the condition map; and generating a webpage in response to the URL request including a link to the resource bundle.

The paradigm of this disclosure includes systems as well. The systems disclosed include a bundle management system comprising: a developer system for: generating a resource bundle with client-based script code based on a potential client device condition, generating a condition map correlating the potential client device condition to the resource bundle, and generating a bundle set including the resource bundle based on a developer version of the client-based script code for caching in a content delivery network; a web service system for: receiving the condition map from the developer system, storing the condition map in a map store, and configuring to operate a web service corresponding to the developer version of the bundle set; and an origination database for storing the bundle set for propagating the bundle set to the content delivery network.

The systems further include a bundle management system with modules implemented as executable instructions on non-transitory machine readable storage medium comprising: a bundle generation module for generating a resource bundle with client-based script code based on a client device condition of a potential client device; a map generation module, coupled to the bundle generation module, for generating a condition map correlating the client device condition to the resource bundle; a bundle set generation module, coupled to the bundle generation module, for generating a bundle set including the resource bundle based on a developer version of the client-based script code for caching in a content delivery network; and a version map module, coupled to the map generation module, for uploading the condition map to a web service system and for configuring the web service system to operate a web service corresponding to the developer version of the bundle set.

Some embodiments of the invention have other aspects, elements, features, and steps in addition to or in place of what is described above. These potential additions and replacements are described throughout the rest of the specification

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A webpage can include static resources and/or dynamic resources. Static resources can include at least images, style sheets, client-side script codes, or any combination thereof. A client device can send a Uniform Resource Locator (URL) request to a website server. The website server can generate and return a webpage based on at least specific attributes, parameters, or settings of the client device. The webpage can include URLs to specific static resources that are stored on an origination database or cached on a content delivery network.

A developer can create a client-side web service or a web application including client-side script code that dynamically organizes and determines contents presented to users on the client device. A developer can bundle together the static resources required for the application to work. A developer can also bundle just the client-side script code. Each of the resource bundles can be generated or optimized based on specific attributes, parameters, or settings of a potential client device. The potential client device is a device that may request a webpage from the web service or web application. A separate set of the resource bundles can also be generated for a different version of development. Bundled resources can be transformed to produce a set of optimized bundle versions.

For example, a beta set of the resource bundles can be generated to test out client-side script code in a beta phase limited to beta users. For another example, a production set of the resource bundles can be generated for general active users of a given website. For another example, a premium set of the resource bundles can be generated for paid active users with extra functionalities of the client-side script code added as compared to unpaid users.

In particular embodiments, it may be preferable to obtain many, if not all, different versions of a static resource before that static resource is used in practical applications. This way, the individual versions of the static resource are readily available whenever they are needed, without having to obtain a specific version of the static resource at the time that version is actually needed and thus resulting in delays.

Thus, particular embodiments can generate various, especially frequently-used, bundles and versions of each static resource and store the bundles and versions of the static resources in an origination database. A content delivery network can then fetch the static resources from the origination database for quick access and for caching. The bundles and versions may be initially pushed to the originating database and subsequently fetched by a content delivery network (CDN). The content delivery network can be a large distributed system of servers deployed in multiple data centers in the Internet. The CDN can serve content to end-users with high availability and high performance. Particularly, the CDN can fetch a file when requested from its cache database. When the file requested cannot be found, the CDN can attempt to locate the file from one of origination databases controlled by a particular web service provider.

For each URL in a resource request, the CDN can copy the content of the URL (e.g., static resource) to a network of servers that are dispersed at geographically different locations, caching the contents of the URL. The CDN can be coupled to an origination database that stores the content of the resource request. A URL can be formatted to be recognizable by the CDN, even if the content of the URL is ultimately stored on the origination database. When a user requests a URL that is part of a CDN, the CDN can redirect the resource request from an origination database to a server in the CDN that is closest to the user and deliver the cached content. The CDN can also communicate with the origination database to deliver any content that has not been previously cached. The process of bouncing through a CDN can be nearly transparent to the user.

In practice, for example, a web application may utilize a large number of static resources, and each static resource may have many versions. The static resources may be grouped according to different levels of granularity (e.g., based on the specific requirements of a practical application). Different condition maps of client device conditions can be defined and constructed for each group of static resources organized by client device conditions. Once these condition maps have been constructed, in particular embodiments, a condition map can be selected for operation on a web service system to provide users with proper resource links to the static resource bundles depending on conditions of the client device of the user.

A resource bundle is a collection of client-side scripts, static resources, or any combination thereof. The resource bundle can be for a client condition description. The client condition description is a description of either hardware or software, the potential client condition description including an attribute, a parameter, a setting, or any combination thereof. For example, the resource bundle can be a style sheet and a client-side script for the client condition description of a client using a Chrome™ browser and English language. The resource bundle may be transformed to produce a set of optimized bundle versions.

A bundle set represents a version of a web application and includes one or more of the resource bundle. The bundle set can include one or more of the resource bundle for one or more condition descriptions of the client device, all belonging to a single version of development. For example, the bundle set can correspond to a beta testing version of development. A bundle set may be formed to capture a single version of operation of a web application. A bundle set can correspond to a condition map. To change a version of operation, the web service system can change from use of an original condition map corresponding to an original bundle set to an updated condition map corresponding to an updated bundle set.

Figure 1:
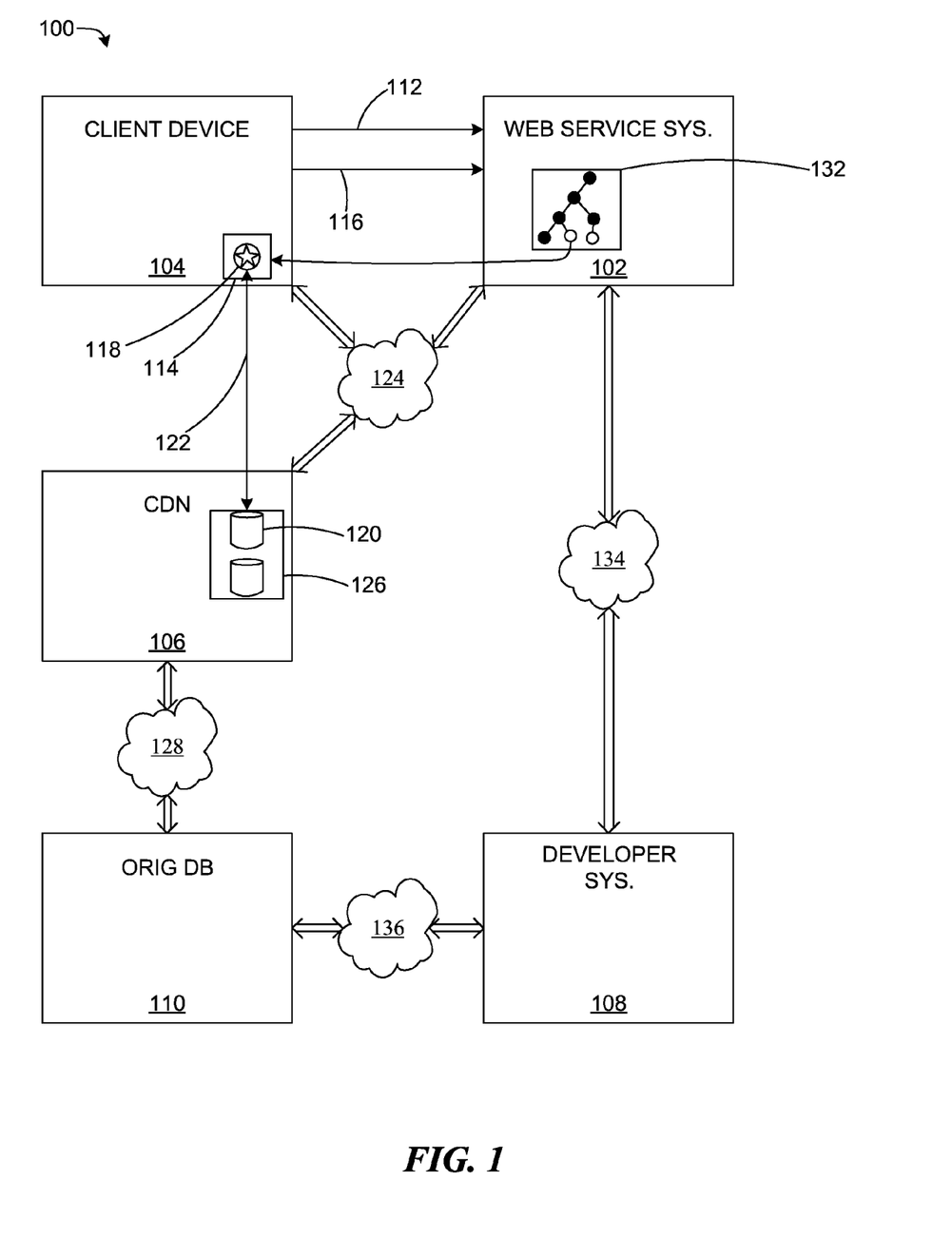
FIG. 1 illustrates a bundle management system, in accordance with an embodiment of the invention.

FIG. 1 illustrates a bundle management system 100, in accordance with an embodiment of the invention. The bundle management system can include a web service system 102, a client device 104, a content delivery network (CDN) 106, a developer system 108, an origination database system 110, or any combination thereof.

The web service system 102 is for serving web content or interactive web applications to users. The web service system 102 can provide a webpage 114 in response to a URL request 112 from the client device.

The web service system 102 can serve web pages, including web related content, such as Java™, Flash™, XML, and so forth. The web service system 102 may provide the functionality of receiving and routing messages between the bundle management system 100 and a client, which may be operating on the client device 104. These messages can be instant messages, web messages, queued messages (e.g., email), text and SMS (short message service) messages, or messages sent using any other suitable messaging technique. The user can send a request to the web service system 102 to upload information, for example, images or videos that are stored. Additionally, the web service system 102 may provide Application Programming Interface (API) functionality to send data directly to native user device operating systems, such as iOS™, ANDROID™ webOS™, and BlackBerry OS™.

The web service system 102 can be one or more computers. The web service system 102 can also be one or more devices with computer functionalities. The web service system 102 can be a computer system as described in FIG. 6. The web service system 102 can be unitary or distributed, span multiple locations, span multiple machines, or reside in a cloud, which may include one or more cloud components in one or more networks.

The client device 104 is a user-operated computer or device with network functionalities to communicate with the web service system 102. The client device 104 can be a computer system as described in FIG. 6. The client device 104 can send the URL request 112 to the web service system 102 for the webpage 114. The web service system 102 can respond to the URL request 112 by sending the webpage 114 to the client device 104. The client device 104 can request web content and interactive web applications from the web service 102.

The URL request 112 is a message sent with address information to obtain a particular webpage. The webpage 114 is a digital document that is suitable for the World Wide Web and can be accessed through a web browser and displayed, such as on a monitor or mobile device.

When sending the URL request 112, a client condition description 116 of the client device 104 can be determined by the web service system 102. For example, the web server system 102 may send a request to the client device 104 to provide the client condition description 116. In another example, the determination can be made by reading metadata sent over together with the URL request 112. The client device 104 can read, from the web page 114, a resource link 118 that is linked to a static resource bundle 120, and send a resource request 122 to the CDN 106. The resource link 118 is dynamically generated by the web service system 102. The resource link 118 can be a URL formatted to address the CDN 106, where the CDN 106 can recognize that the URL addresses data on or accessible to (e.g. data on the origination database 110) the CDN 106. The CDN 106 is for sending the static resource bundle 120 to the client device 104 upon receiving the resource request 122. If the static resource bundle 120 is unavailable and not cached on the CDN 106, the CDN can fetch the static resource bundle 120 from the origination database 110 for sending to the client device 104 and for caching.

The client condition description 116 is a collection of information regarding the client device 104, including one or more of an attribute, a parameter, a setting, or any combination thereof. The resource link 118 is a digital address of a file, such as a URL website address or a file identification code. The static resource bundle 120 is a collection of static resources such as described above. The resource request 122 is a message sent to a computer system or network for seeking to obtain one or more of the static resource bundle 120. The resource request 122 can be a message containing a URL. The URL is determined from and includes the resource link 118. The resource request 122 can specify the static resource bundle 120 that the client device 104 wants to download. If the static resource bundle 120 is unavailable, the CDN 106 can fetch the static resource bundle 120 from the origination database 110 for sending to the client device 104 and for caching.

The web service system 102 can be connected to the client device 104 via a network channel 124. The network channel 124 is a medium of communication. For example, the URL request 112, the client condition description 116, the resource request 122, the webpage 114, or any combination thereof can be communicated through the network channel 124.

For example, the network channel 124 can be an Ethernet or other wire-based network or a wireless NIC (WNIC) or wireless adapter for communicating with a wireless network, such as a WI-FI network. The network channel 124 can be any suitable network for any suitable communication interface. As an example and not by way of limitation, the network channel 124 can be an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, the network channel 124 can be a wireless PAN (WPAN) (such as, for example, a BLUETOOTH WPAN), a WI-FI network, a WI-MAX network, a 3G or 4G network, a cellular telephone network (such as, for example, a Global System for Mobile Communications (GSM) network).

In one embodiment, the network channel 124 uses standard communications technologies and/or protocols. Thus, the network channel 124 can include links using technologies such as Ethernet, 802.11, worldwide interoperability for microwave access (WiMAX), 3G, 4G, CDMA, digital subscriber line (DSL), etc. Similarly, the networking protocols used on the network channel 124 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network channel 124 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

The client device 104 comprises one or more computing devices that can receive user input and can transmit and receive data via the network channel 124. In one embodiment, the client device 104 is a conventional computer system executing, for example, a Microsoft Windows™-compatible operating system (OS), Apple OS X™ and/or a Linux™ distribution. In another embodiment, the client device 104 can be a device having computer functionality, such as a personal digital assistant (PDA), mobile telephone, smart-phone, etc. The client device 104 is configured to communicate via the network channel 124. The client device 104 can execute an application, for example, a browser application that allows a user of the client device 104 to interact with the web service system 102. In another embodiment, the client device 104 interacts with the web service system 102 through an application programming interface (API) that runs on the native operating system of the client device 104, such as iOS™ and ANDROID™.

The CDN 106 is for delivering static contents to the client device 104. The CDN 106 can deliver the static contents from its cache or fetch the static contents from the origination database 110 when the static contents are not found its cache. The static contents can include images, sprites, style sheets, videos, other passive or interactive media, or any combination thereof. The CDN 106 can cache the static resource bundle 120. The CDN 106 can also cache a bundle set 126, each bundle set 126 represents a version of the application and each includes one or more of the static resource bundle 120.

The CDN 106 is a large distributed system of servers deployed in data centers for caching static files. The CDN 106 can serve content to end-users with high availability and high performance. Particularly, the CDN 106 can fetch a file when requested from its cache database. When the file requested cannot be found, the CDN 106 attempts to locate the file from one of the origination databases, such as the origination database 110, which is controlled by a particular web service provider, such as the web service system 102.

The developer system 108 is for generating and uploading the static resource bundle 120 to the origination database 110. The static resource bundle 120 then gets propagated to the CDN 106 through the origination database 110. The origination database 110 is a data retention and providing system for storing static content that may be requested by the CDN 106 on behalf of a client operating on the client device 104. The origination database 110 can act as the first place that the CDN 106 can look for a file before the file is cached on the CDN database. The origination database 110 can be maintained within a network of the developer system 108. Alternatively, the origination database 110 can be maintained within a network of the CDN 106.

For example, the origination database 110 can be in communication with the CDN 106 through a delivery network 128. The delivery network 128 can be the same as the network channel 124 described above.

For example, the delivery network 128 can be an Ethernet or other wire-based network or a wireless NIC (WNIC) or wireless adapter for communicating with a wireless network, such as a WI-FI network. The delivery network 128 can be any suitable network for any suitable communication interface. As an example and not by way of limitation, the delivery network 128 can be an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, the delivery network 128 can be a wireless PAN (WPAN) (such as, for example, a BLUETOOTH WPAN), a WI-FI network, a WI-MAX network, a 3G or 4G network, a cellular telephone network (such as, for example, a Global System for Mobile Communications (GSM) network).

In one embodiment, the delivery network 128 uses standard communications technologies and/or protocols. Thus, the delivery network 128 can include links using technologies such as Ethernet, 802.11, worldwide interoperability for microwave access (WiMAX), 3G, 4G, CDMA, digital subscriber line (DSL), etc. Similarly, the networking protocols used on the delivery network 128 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the delivery network 128 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

The developer system 108 can upload a condition map 132 to the web service system 102. The web service system 102 can generate the resource link 118 in the webpage 114 based on the condition map 132 and the client condition description 116 of the client device 104.

The condition map 132 is a data structure that correlates a potential client condition description, such as the client condition description 116, with a resource bundle, such as the static resource bundle 120. The potential client condition description is defined as a client condition description of a device that may request a webpage from the web service system 102. The condition map 132 can be a hash table, a tree, a binary tree, a dictionary, an array, a vector, a query-based database, or any combination thereof. With an input of the potential client condition description, the condition map 132 can be traversed to output a location of a resource or a resource link, such as the resource link 118. Optionally, with an input of the resource link, the condition map 132 can be traversed to output the potential client condition description. The resource link 118 is the address information of the resource bundle correlated with the potential client condition description.

The developer system 108 can upload the static resource bundle 120 to an origination database 110. After the resource request 122 is received, when the requested resource is determined not to be present on the CDN 106, the CDN 106 can access the origination database 110 to obtain the requested resource. The resource request 122 determined from the resource link 118 is used by the CDN 106 to fetch the correct requested resource from the origination database 110. The resource link 118 can be a URL formatted to address the CDN 106, where the CDN 106 can recognize that the URL addresses data on or accessible to (e.g., data on the origination database 110) the CDN 106. Once the CDN 106 downloads the requested resource once, the CDN 106 can cache the requested resource for future access by the client device 104.

For example, the developer system 108 can be in communication with the web service system 102 through a server network 134. The server network 134 can be the same as the delivery network 128 or the network channel 124 described above.

For example, the server network 134 can be an Ethernet or other wire-based network or a wireless NIC (WNIC) or wireless adapter for communicating with a wireless network, such as a WI-FI network. The server network 134 can be any suitable network for any suitable communication interface. As an example and not by way of limitation, the server network 134 can be an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, the server network 134 can be a wireless PAN (WPAN) (such as, for example, a BLUETOOTH WPAN), a WI-FI network, a WI-MAX network, a 3G or 4G network, a cellular telephone network (such as, for example, a Global System for Mobile Communications (GSM) network).

In one embodiment, the server network 134 uses standard communications technologies and/or protocols. Thus, the server network 134 can include links using technologies such as Ethernet, 802.11, worldwide interoperability for microwave access (WiMAX), 3G, 4G, CDMA, digital subscriber line (DSL), etc. Similarly, the networking protocols used on the server network 134 can include multiprotocol label switching (MPLS), the transmission control protocol/

Internet protocol (TCP/IP), the User Datagram Protocol (UDP), the hypertext transport protocol (HTTP), the simple mail transfer protocol (SMTP), and the file transfer protocol (FTP). The data exchanged over the server network 134 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

For example, the developer system 108 can be in communication with the origination database 110 through a database network 136. The database network 136 can be the same as the network channel 124, the delivery network 128, or the server network 134 described above.

For example, the database network 136 can be an Ethernet or other wire-based network or a wireless NIC (WNIC) or wireless adapter for communicating with a wireless network, such as a WI-FI network. The database network 136 can be any suitable network for any suitable communication interface. As an example and not by way of limitation, the database network 136 can be an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, the database network 136 can be a wireless PAN (WPAN) (such as, for example, a BLUETOOTH WPAN), a WI-FI network, a WI-MAX network, a 3G or 4G network, a cellular telephone network (such as, for example, a Global System for Mobile Communications (GSM) network).

In one embodiment, the database network 136 uses standard communications technologies and/or protocols. Thus, the database network 136 can include links using technologies such as Ethernet, 802.11, worldwide interoperability for microwave access (WiMAX), 3G, 4G, CDMA, digital subscriber line (DSL), etc. Similarly, the networking protocols used on the database network 136 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the database network 136 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

By using the resource link 118 (which is linked to the resource bundle 120) and uploading the condition map 132 to the web service system 102 together, the time delay it takes to update the intelligence of a web service may be decreased. The origination database 110 can have only a single point or only a few points of contact with the developer system 108. The bundle management system 100 can upload the resource bundle 120 or the bundle set 126 once to the origination database 110 without having to update new code to every single server within the web service system 102. The number of servers in the web server system 102 tends to be significantly higher than the points of contact of the origination database. Hence, the time saved in updating the intelligence of web service tends to be significant.

Figure 2:
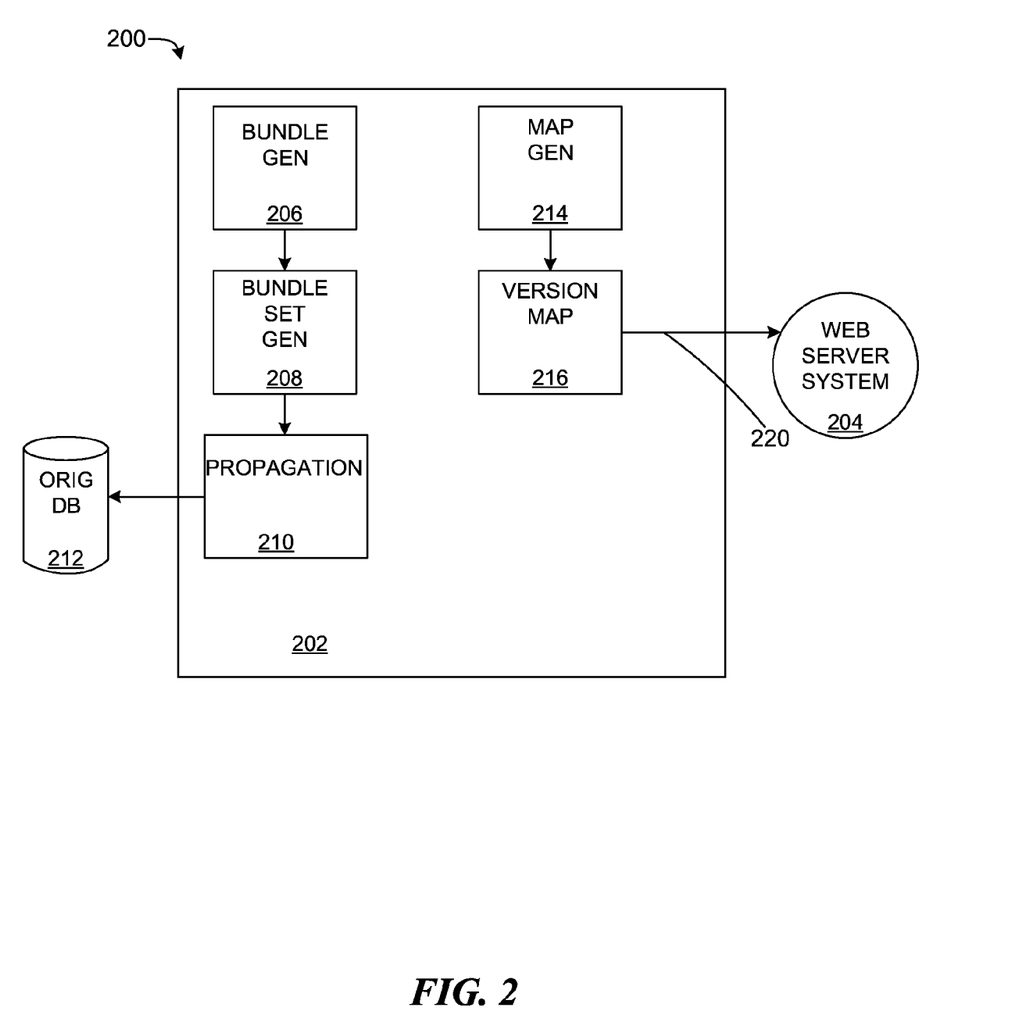
FIG. 2 is an example of a control flow diagram of a bundle management system.

Referring now to FIG. 2, therein is shown an example of a control flow diagram of a bundle management system 200. The bundle management system 200 can be, for example, the bundle management system 100 of FIG. 1. The bundle management system 200 can be implemented by a developer system 202, such as the developer system 108 of FIG. 1. The one or more methods can be implemented by modules described below, including associated components and storages.

The bundle management system 200 can include one or more methods of generating a resource bundle, such as the static resource bundle 120 of FIG. 1. The resource bundle can be stored on an origination database, and the content delivery network can fetch the resource bundle when the resource bundle is requested. The bundle management system 200 can also include one or more methods of uploading a condition map, such as the condition map 132 of FIG. 1, to a web service system 204, such as the web service system 102 of FIG. 1. The resource bundle can be located or otherwise accessed by a link (e.g., URL) on a webpage. The link is generated dynamically by a web service system. The content delivery network can be responsible for delivering the resource bundle when properly requested by a client device.

The modules can be implemented as hardware modules, software modules, or any combination thereof. For example, the modules described can be software modules implemented as instructions on a non-transitory memory capable of being executed by a processor or a controller on a computer system described in FIG. 6.

The bundle management system 200 can include additional, fewer, or different modules for various applications. Conventional components such as network interfaces, security functions, load balancers, failover servers, management and network operations consoles, memory stores, components, and the like are not shown so as to not obscure the details of the system.

The developer system 202 can include a bundle generation module 206 for generating a resource bundle of static resources including client-side script. The resource bundle, such as the resource bundle 120, is a collection of client-side scripts, static resources, or any combination thereof. The resource bundle can be for a specific potential client condition description, such as the client condition description 116 of FIG. 1, of a client device, such as the client device 104 of FIG. 1. The potential client condition description can be a description of either hardware or software, the potential client condition description including an attribute, a parameter, a setting, or any combination thereof.

The developer system 202 can include a bundle set generation module 208. The bundle set generation module 208 can be coupled to the bundle generation module 206 to receive at least the resource bundle. The bundle set generation module 208 is for generating a bundle set. The bundle set, such as the bundle set 126 of FIG. 1, represents a version of the application and each includes one or more of the resource bundle. The bundle set can include one or more of the resource bundle for one or more condition descriptions of the client device, all belonging to a single version of development. The bundle set can correspond to a particular version of a web service or a web application. For example, the bundle set can correspond to a beta testing version of development.

Each of the resource bundle can differ from each other based on a client condition description of the client device, but provides the same web service or the same web application. Each version of the bundle set differs from each other based on the version of web service, and hence can provide different or modified functionalities to the web service or the web application.

The developer system can include a propagation module 210. The propagation module 210 can be coupled to the bundle set generation module 208 to receive at least the bundle set and the bundle generation module 206 (coupling not shown) to receive at least the resource bundle.

The propagation module 210 is for scheduling a push of the resource bundle or the bundle set to an origination database 212, such as the origination database 110 of FIG. 1. The propagation module 210 can push the bundle set when uploading the condition map simultaneously, such that once the bundle set becomes available in the origination database 212, the condition map also becomes available on the web service system 204. Once available in the origination database 212, the resource bundle or bundle set may be accessed and cached onto the content delivery network. Stated another way, the resource bundle or bundle set is, in a way, propagated to the content delivery network (via the origination database).

The developer system can include a map generation module 214. The map generation module 214 is for generating a condition map, such as the condition map 132 of FIG. 1, for sending to the web service system 204. The condition map is a map correlating a client condition description of the client device to a particular resource bundle, such as a URL to the resource bundle 120. The condition map can associate a resource link, such as the resource link 118 of FIG. 1, with the client condition description, where the resource link is associated with the particular resource bundle.

The developer system can include a version map module 216. The version map module 216 can be coupled to the map generation module 214 to receive at least the condition map. The version map module 216 is for uploading the condition map to the web service system 204. The condition map can be uploaded simultaneously to all machines of the web service system 204. The condition map can also be uploaded to just one of the machines of the web service system 204, and propagated to the rest of the machines through an internal update process of the web service system 204.

The version map module 216 can also be for generating a version configuration 220 for configuring the web service system 204. The version configuration 220 is a message for sending to the web service system 204 to change the version of operation of the web service on the web service system 204. The version map module 216 can configure the web service system 204 by changing a single site variable on the web service system 204. The version configuration 220 can configure the web service system 204 to link users to a bundle set corresponding to a version of web application.

Because part of the web service application can be stored within the resource bundle, the version of that application can be changed when the web service system 204 points to a different set of the resource bundle, such as a different version of the bundle set 126, when responding to URL requests. The version configuration 220 when received can cause the web service system 204 to change a site variable such that the web service system 204 operates with a different version of the condition map i.e., a condition map that corresponds to the different version of the bundle set 126.

Figure 3:
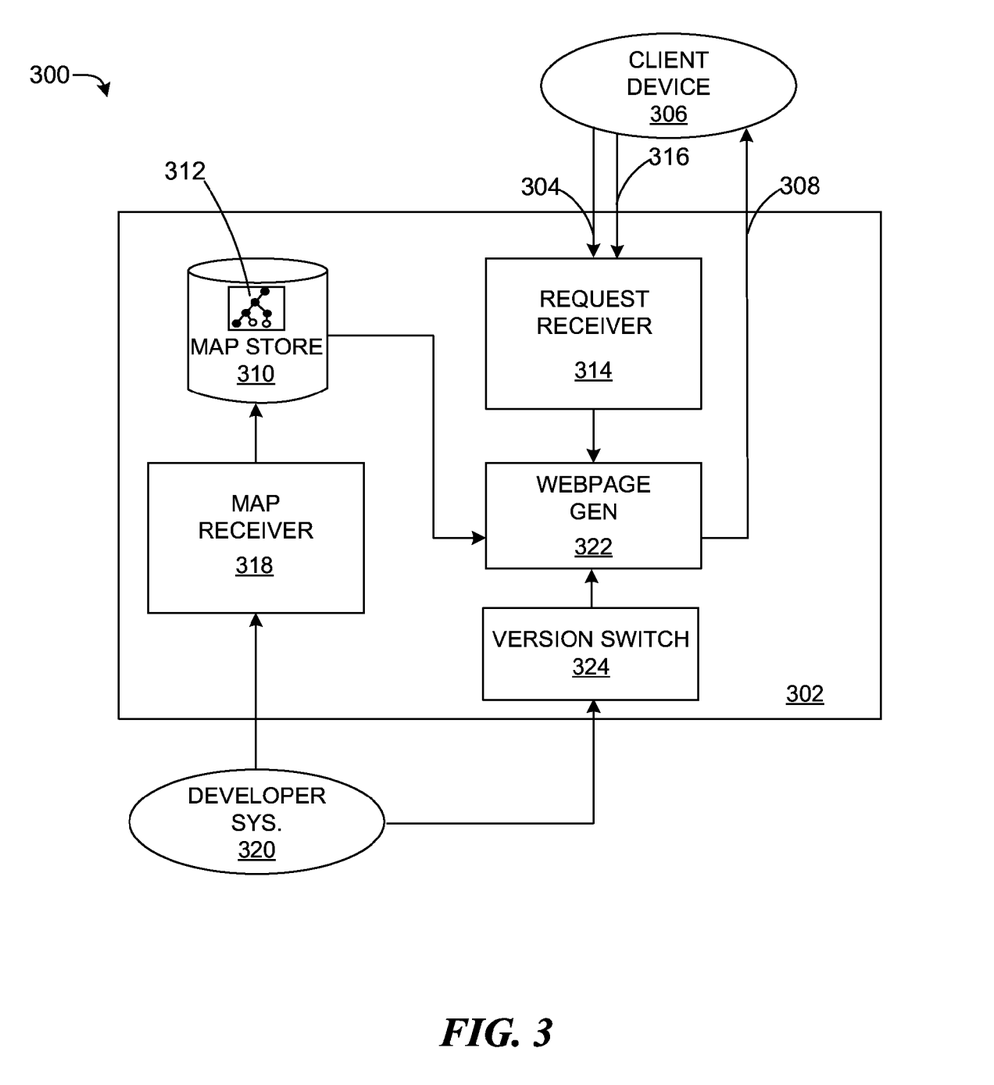
FIG. 3 is another example of a control flow diagram of a bundle management system.

Referring now to FIG. 3, therein is shown an example of a control flow diagram of a bundle management system 300. The bundle management system 300 can be, for example, the bundle management system 100 of FIG. 1. The bundle management system 300 can also, for example, work in conjunction with the bundle management system 200 of FIG. 2. The bundle management system 300 can be implemented by a web service system 302, such as the web service system 102 of FIG. 1. The one or more methods can be implemented by modules described below, including associated components and storages.

The bundle management system 300 can include one or more methods of generating a webpage in response to the URL request, the webpage including a link to a resource bundle, the link determined from a condition map. The bundle management system 300 can also include one or more methods of changing a web service version of a web server system by changing the condition map used to determine the webpage with the link.

The modules can be implemented as hardware modules, software modules, or any combination thereof. For example, the modules described can be software modules implemented as instructions on a non-transitory memory capable of being executed by a processor or a controller on a computer system described in FIG. 6.

The bundle management system 300 can include additional, fewer, or different modules for various applications. Conventional components such as network interfaces, security functions, load balancers, failover servers, management and network operations consoles, and the like are not shown so as to not obscure the details of the system.

The bundle management system 300 can include a web server system 302, such as the web service system 102 of FIG. 1. The web server system 302 is for responding to a URL request 304, such as the URL request 112 of FIG. 1, from a client device 306, such as the client device 104 of FIG. 1, with a webpage 308 such as the webpage 114 of FIG. 1.

The web server system 302 can include a map store 310. The map store 310 is for storing a condition map 312, such as the condition map 132 of FIG. 1. Although it has been illustrated that the map store 310 is within the web server system 302, it is understood that the map store 310 can also be on an external system, such as an external database in communication with the web server system 302.

The web server system 302 can include a request receiver module 314 for receiving the URL request 304 and a client condition description 316, such as the client condition description 116 of FIG. 1, from the client device 306. The client condition description 316 can include a hardware or software condition of the client device 306, the condition including a parameter, a setting, an attribute, or any combination thereof.

The web server system 302 can include a map receiver module 318 for receiving the condition map 312 from a developer system, such as the condition map 132 from a developer system 320, such as the developer system 108 of FIG. 1. The map store 310 can be coupled to the map receiver module 318 to receive at least the condition map 312.

The web server system 302 can include a webpage generation module 322 for generating the webpage 308 in response to the URL request 304 and based on the client condition description 316. The webpage generation module 322 can be coupled to the request receiver module 314 to receive at least the client condition description 316 and the map store 310 to receive at least the condition map 312. The webpage 308 can be generated based on the condition map 312. The webpage 308 can include a resource link to a resource bundle in accordance with the condition map 312.

The web server system 302 can include a version switch module 324. The version switch module 324 is for changing a site variable of the web server system 302 to change a version of a web application or a web service. The web application or the web service can be partially provided from the web server system 302 and partially provided from the resource bundle provided through the resource link.

The version switch module 324 can be coupled to the webpage generation module 322 to change which instance of the condition map 312 for the web generation module 322 to use. The version switch module 324 can receive a version configuration message from the developer system 320, such as the version configuration 220 of FIG. 2.

Figure 4:
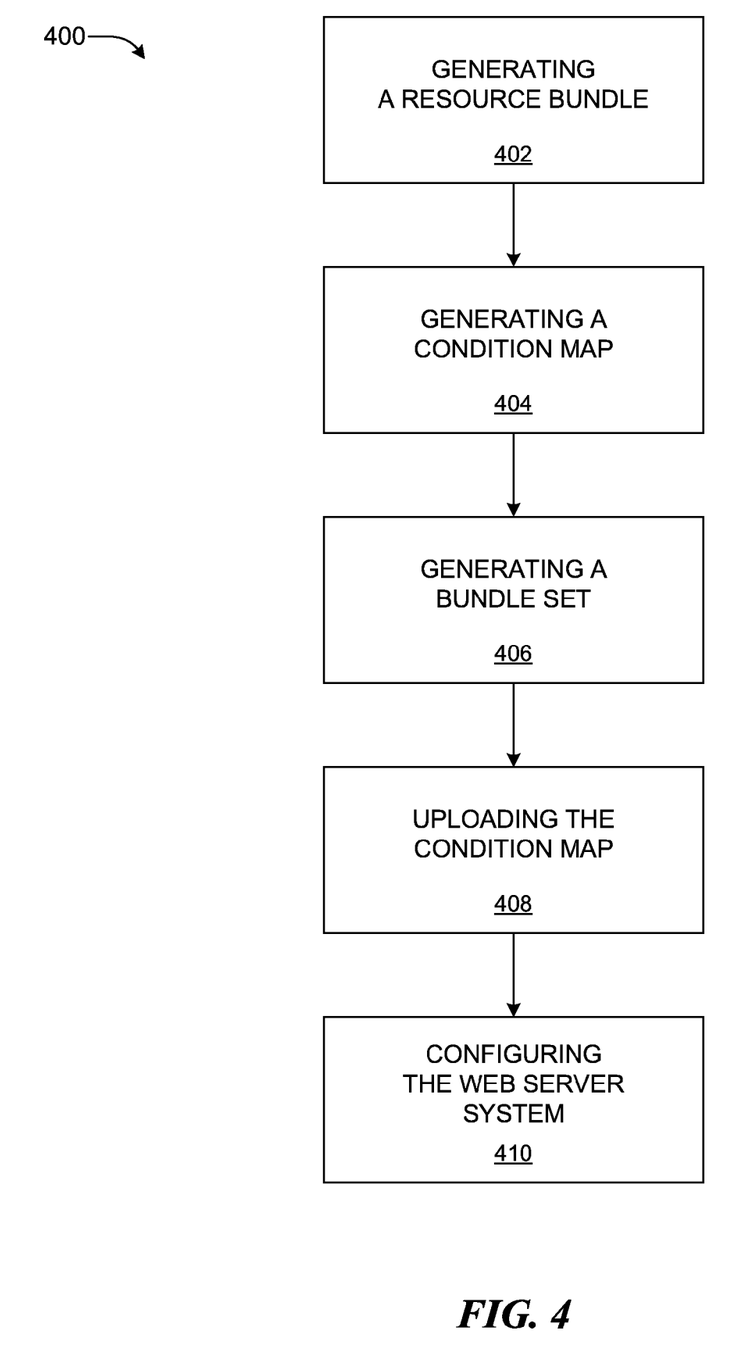
FIG. 4 is a flow chart of a method of operation of the bundle management system in a further embodiment of the present invention.

Referring now to FIG. 4, therein is shown a flow chart of a method 400 of operation of the bundle management system 100 in a further embodiment of the present invention. The method 400 includes: generating a resource bundle with client-based script code based on a client device condition in a block 402; generating a condition map correlating the client device condition to the resource bundle in a block 404; generating a bundle set including the resource bundle based on a developer version of the client-based script code for storing in an origination database and/or caching in a content delivery network in a block 406; uploading the condition map to a web service system in a block 408; and configuring the web service system to operate a web service corresponding to the developer version of the bundle set in a block 410.

Figure 5:
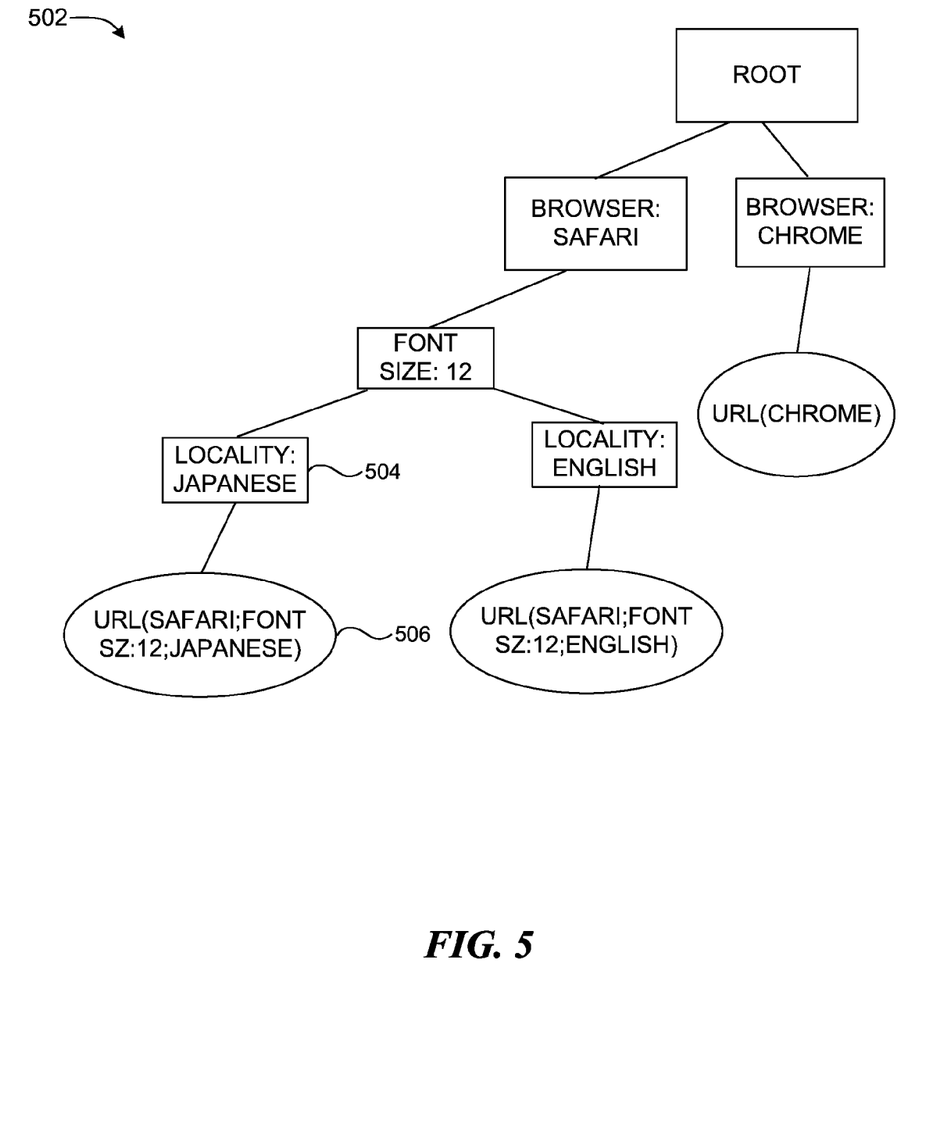
FIG. 5 is an example of an illustration of a condition map.

Referring now to FIG. 5, therein is shown an example of an illustration of a condition map 502. For example, the condition map 502 can be the condition map 132 of FIG. 1. The condition map 502 is illustrated in a tree format. However, it is understood that the condition map 502 can be represented by a variety of data structures, including a hash table, a dictionary, a graph, a binary tree, an array, a matrix, other data structures, or any combination thereof.

The condition map 502 can include one or more of a client condition description 504, such as the client condition description 116 of FIG. 1, each mapping to a bundle link 506, such as a URL or the resource link 118 of FIG. 1. For example, each branch node of the tree representing the condition map 502 can represent a condition in the client condition description 504. The condition map 502 can include the bundle link 506 at each leaf node of the tree. The bundle link 506 can be a URL pointing to a resource bundle. Each branch decision is made by comparing the condition in the branch node to the client condition description to see if the client condition description includes the branch condition. All of the branch conditions from the root node to the leaf node can correspond to the client condition description. The bundle link 506 for that client condition description can be retrieved from the leaf node.

The tree structure can be a way to correspond the bundle link 506 to multiple conditions. For example, the bundle link 506 for "URL(SAFARI;FONT SZ:12;JAPANESE)" can correspond to not only to the condition of "LOCALITY: JAPANESE," but also to the conditions of "FONT SIZE: 12" and "BROWSER: SAFARI." Subtrees can be compressed if, for example, the bundle contents for the Chrome™ browser does not change based on the font-size. In that case, the bundle link for "URL(CHROME)" can correspond to only the condition of the browser being Chrome™.

The client condition description 504 can be a single condition or a plurality of conditions. The client condition description 504 can be based on a single or a plurality of a conjunction condition, a disjunction condition, a negation condition, a necessary condition, a sufficient condition, or any combination thereof. The client condition description 504 can be, for example, a browser type, a font-size, a locality setting, a operating system type, an Internet speed measure, a processor speed measure, a local memory measure, other attribute, parameter, or setting, or any combination thereof.

Figure 6:
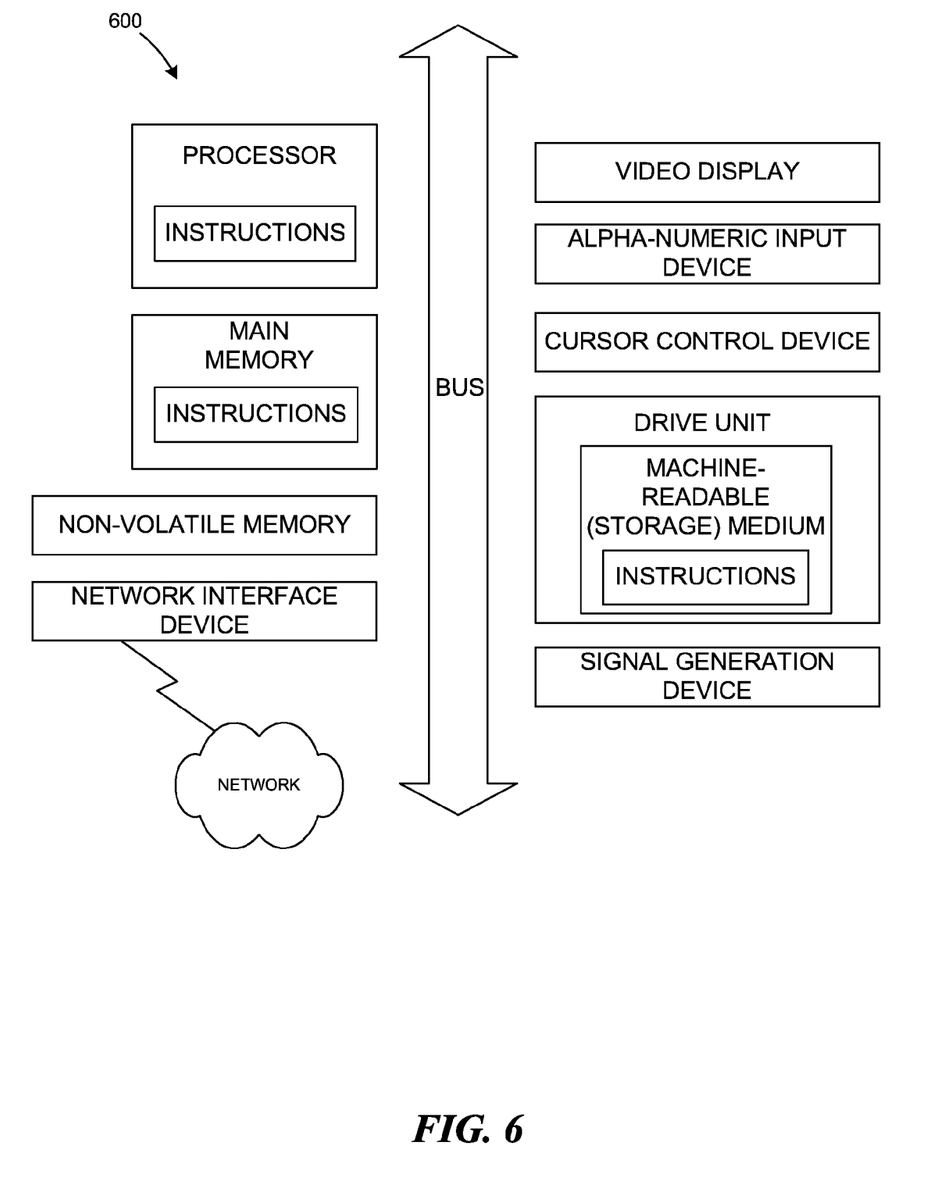
FIG. 6 is a diagrammatic representation of a machine in the example form of a computer system within which a set of instructions, for causing the machine to perform any one or more of the methodologies or modules discussed herein, may be executed.

Referring now to FIG. 6, therein is shown a diagrammatic representation of a machine in the example form of a computer system 600 within which a set of instructions, for causing the machine to perform any one or more of the methodologies or modules discussed herein, may be executed.

In the example of FIG. 6, the computer system 600 includes a processor, memory, non-volatile memory, and an interface device. Various common components (e.g., cache memory) are omitted for illustrative simplicity. The computer system 600 is intended to illustrate a hardware device on which any of the components depicted in the example of FIGS. 1-3 (and any other components described in this specification) can be implemented. The computer system 600 can be of any applicable known or convenient type. The components of the computer system 600 can be coupled together via a bus or through some other known or convenient device.

This disclosure contemplates the computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 600. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 600. The interface can include an analog modem, isdn modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 6 reside in the interface.

In operation, the computer system 600 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

CLARIFICATION

The above description and drawings are illustrative and are not to be construed as limiting the invention to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

While processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §114, ¶6, other aspects may likewise be embodied as a means-plus-function claim, or in other forms, such as being embodied in a computer-readable medium. (Any claims intended to be treated under 35 U.S.C. §114, ¶6 will begin with the words "means for".) Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method of operating a bundle management system, comprising:
   associating a bundle set and a condition map at a computer system to facilitate a web service developer to release a developer version of client-side code for multiple client device conditions, the client-side code capable of dynamically organizing and determining content to present at a potential client device;
   wherein the bundle set includes multiple resource bundles corresponding to the developer version of the client-side code; and wherein the condition map is configured to identify at least a resource bundle in the bundle set that corresponds to at least a potential client device condition;
   providing the bundle set from the computer system to an origination server of a content delivery network (CDN); and
   providing the condition map from the computer system to a web server to configure the web server to operate a web service capable of tailoring to multiple client device conditions by referencing the resource bundle in the CDN corresponding to a specific client device condition associated with a requesting device according to the condition map.

2. The computer-implemented method of claim 1, wherein the condition map identifies a link to the resource bundle in the CDN.

3. The computer-implemented method of claim 1, wherein the resource bundle includes an image, a style sheet, or client-side script.

4. The computer-implemented method of claim 1, wherein the specific client device condition corresponds to a user setting of the potential client device.

5. The computer-implemented method of claim 1, wherein the specific client device condition corresponds to an attribute of the potential client device.

6. The computer-implemented method of claim 1, wherein providing the bundle set to the origination server includes pushing the bundle set when providing the condition map to the web server.

7. The computer-implemented method of claim 1, wherein providing the condition map includes configuring the web server to change a site variable of the web server.

8. A web server comprising:
one or more computer processors configured to:
store a condition map to facilitate the web server to provide a developer version of at least a portion of a website for multiple client device conditions, wherein the condition map associates at least a potential device condition of a potential client device to a resource bundle in a content delivery network (CDN),
receive a Uniformed Resource Locator (URL) request;
extract a client device condition from a first client device; and
generate a content page in response to the URL request, the content page including a link to the resource bundle in the CDN corresponding to the client device condition according to the condition map.

9. The web server of claim 8, wherein the one or more computer processors are configured to provide at least a web page to a browser application of the first client device or to provide content through an application programming interface accessible by an application of the first client device.

10. The web server of claim 8, wherein the resource bundle includes client-side code that, when executed, dynamically organizes and determines content to present at the potential client device.

11. The web server of claim 8, wherein the condition map corresponds to a bundle set including multiple resource bundles corresponding to the developer version of at least the portion of the website, and wherein each of the multiple resource bundles corresponds to at least a different potential device condition.

12. The web server of claim 8, wherein the one or more computer processors are further configured to locate the resource bundle in the CDN using the condition map by comparing the client device condition with the potential device condition in the condition map.

13. The web server of claim 8, wherein the one or more computer processors are further configured to:
receive a version configuration for specifying which instance of the condition map to utilize for locating the resource bundle; and
configure the web server to operate according to the version configuration.

14. The web server of claim 8, wherein the one or more computer processors are further configured to:
store the condition map on an external database to the web server.

15. The web server of claim 8, wherein the one or more computer processors are further configured to store the condition map in a tree data structure.

16. A non-transitory machine readable memory comprising:
instructions for associating a bundle set and a condition map at a computer system to facilitate a web service developer to release a developer version of at least a portion of a web service for multiple client device conditions;
wherein the bundle set includes multiple resource bundles corresponding to the developer version; and wherein the condition map is configured to identify at least a resource bundle in the bundle set that corresponds to at least a client device condition;
instructions for providing the bundle set from the computer system to an origination server of a content delivery network (CDN); and
instructions for providing the condition map from the computer system to a web server to configure the web server to operate the web service capable of tailoring to multiple client device conditions by referencing the resource bundle in the CDN corresponding to a specific client device condition associated with a requesting device according to the condition map.

17. The machine readable memory of claim 16, wherein the web server is a computer server configured to serve web pages to the requesting device.

18. The machine readable memory of claim 16, wherein the web server is a computer server configured to provide an application programming interface (API) to the requesting device.

19. The machine readable memory of claim 16, wherein each of the multiple resource bundles includes client-side code is capable of dynamically organizing and determining content to present at the requesting device.

20. The machine readable memory of claim 16, wherein the instructions for providing the condition map to the web server when the bundle set is provided to the origination server.

* * * * *